United States Patent Office 3,813,308
Patented May 28, 1974

3,813,308
CASE BONDING SYSTEM FOR CAST COMPOSITE PROPELLANTS
Paul H. Skidmore, Frostburg, Md., assignor to Hercules Incorporated, Wilmington, Del.
No Drawing. Filed Mar. 18, 1969, Ser. No. 808,719
Int. Cl. C06b 21/00
U.S. Cl. 149—109          5 Claims

ABSTRACT OF THE DISCLOSURE

A process for bonding a carboxy-containing rubber liner for a cast composite propellant to the rocket motor insulation is described. Positive bonding without detriment to rocket motor performance is achieved with an organic polyisocyanate surface preparation which chemically unites the insulation to the liner during cure of the liner.

---

This invention relates to bonding a cast composite propellant to the insulated surface of a rocket motor casing and more particularly to an improved method for chemically bonding a carboxy-containing rubber liner for cast composite propellant to an elastomeric insulator material.

In the propellant field and more particularly in solid rocketry, it is necessary to bond the propellant grain to an insulator, as, for example, to the elastomeric insulation which is the lining of a motor case. Unless the propellant grain is securely held in the motor case throughout motor firing, nozzle blockage, unpredicatable variations in burning surface, over-pressure, and even case rupture can occur. It is therefore necessary to maintain between the propellant and the internal insulation a bond which has sufficient strength to prevent propellant separation during handling, storage and firing.

The major problem in obtaining good adhesion between the composite propellant and the insulator concerns the bonding of the dissimilar materials used in the propellant grain and the insulator.

One system which has been proposed for attaching the elastomeric insulator to a composite propellant grain containing a binder fuel of carboxy-containing rubber employs an intermediate adhesive coating or liner of carboxy-containing rubber. However, unless the insulator surface is scrupulously cleaned and abraded, the liner will not uniformly wet the insulator surface and provide a continuous bond line. Moreover, the abrasion and removal of surface contaminants and other anti-adhesive material from the insulator surface is a relatively costly, as well as time consuming operation since it involves degreasing the insulator with an organic solvent, mechanically abrading the surface by buffing, shot blasting or grinding, removing any loose particles after abrasion and then washing the surface a second time with an organic solvent.

Now, in accordance with the present invention it has been found that positive and reliable bonding of the carboxy-containing rubber liner to the insulator can be achieved without the necessity of mechanically abrading and scrupulously cleaning the insulator surface and without detriment to the performance characteristics of the rocket motor by utilizing a surface preparation material which chemically bonds the elastomeric insulator to the carboxy-containing rubber liner during cure of the liner. More specifically, the present invention relates to a process for chemically bonding the elastomeric insulated surface of a rocket motor casing to the carboxy-containing rubber liner for a composite propellant containing a binder fuel of carboxy-containing rubber by (a) treating the insulated surface with a solution of an organic polyisocyanate in an organic solvent, (b) drying the treated surface to remove the solvent, (c) applying a liner of uncured carboxy-containing rubber to the dried surface and then (d) curing the liner prior to casting the propellant thereon.

The elastomeric materials which can be utilized as the rocket casing insulator are any of the well-known, vulcanizable elastomers or rubbers. Particularly preferred are the styrenebutadiene rubbers, polybutadiene, poly(2, 3-dimethylbutadiene), and the like, which can, if desired contain such conventional filler material as silica, carbon black, asbestos, and the like.

The type of propellant for which the present bonding system is suited is the cast composite propellant containing a binder-fuel of a carboxy-containing rubber. Such propellants comprise a solid oxidant such as ammonium perchlorate, ammonium nitrate, potassium perchlorate, cyclotrimethylene trinitramine, or the like, a metal fuel and plasticizer held together by a carboxy-containing rubber binder which is also a fuel. Such binder-fuels are formed by curing an elastomeric polymer containing an average of not less than about 2 free carboxyl groups per molecule, with an aziridinyl and/or epoxide curing agent. Preferred polymers include the homopolymers of an olefin such as isobutylene or a conjugated diene containing 4–8 carbon atoms, such as butadiene-1,3, isoprene, octadiene-1,3 and the like, copolymers of more than 1 olefin or conjugated diene, such as an ethylene-propylene copolymer, copolymers of a conjugated diene with other copolymerizable monomers which are preferably vinyl substituted aromatic compounds such as tyrene, the 1- or 2-vinyl naphthalenes and their alkyl, aryl, alkoxy, cycloalkyl, aralkyl, alkaryl, aryloxy and dialkyl amino derivatives or a mixture of any of the above homopoymers or copolymers. Particularly preferred are the carboxy-terminated polymers of butadiene and isobutylene, which polymers have molecular weights ranging from about 1,000 to about 20,000 and preferably from about 3,000 to about 10,000.

The liner material for the composite propellant serves as a stress transfer medium to accommodate any inherent differences in the coefficients of expansion of the motor case and propellant, as well as an intermediate adhesive between the propellant and the insulator on the motor casing. The liner material can be any of the aziridinyl or epoxide curable, carboxy-containing rubbers useful as the propellant binder. Preferred rubbers include the homopolymers of an olefin such as isobutylene or a conjugated diene containing 4–8 carbon atoms, such as butadiene-1,3, isoprene, octadiene-1,3 and the like, copolymers of more than 1 olefin or conjugated diene, such as an ethylene-propylene copolymer, copolymers of a conjugated diene with other copolymerizable monomers which are preferably vinyl substituted aromatic compounds such as styrene, the 1- or 2-vinyl naphthalenes and their alkyl, aryl, alkoxy, cycloalkyl, aralkyl, alkaryl, aryloxy and dialkyl amino derivatives, or a mixture of any of the above homopolymers or copolymers. Particularly preferred are the carboxy-terminated polymers of butadiene and isobutylene, which polymers have molecular weights ranging from about 1,000 to about 20,000 and preferably from about 3,000 to about 10,000.

Curing agents for the carboxy-containing rubber materials of the liner and propellant binder are well known and are usually of the aziridinyl and/or epoxide type. Particularly preferred are the epoxide curing agents which are diepoxides, triepoxides or mixtures thereof. Suitable diepoxides include the saturated or unsaturated aliphatic, cycloaliphatic, aromatic or heterocyclic diepoxides and particularly the aliphatic diepoxides containing 4 to 30 carbon atoms, the cycloaliphatic diepoxides, containing 12 to 40 carbon atoms and the diglycidyl ethers of dihydric phenols. Suitable triepoxides include the aliphatic, cycloaliphatic or aromatic triepoxides and particularly the triepoxyalkanes containing 6 to 25 carbon atoms, the tri(epoxycycloalkane carboxylates), the triglycidylethers of trihydric alcohols such as glycerol, 1,1,1-tri(hydroxymethyl) propane, 1,2,6-hexanetriol and the higher alcohols containing up to about 25 carbon atoms, and the triglycidyl ethers of trihydric phenols such as phloroglucinol, the trihydroxydiphenyl methanes and propanes, the trihydroxyaminophenols, the trisphenols and the like.

As stated above, the surface of the insulator is treated with a solution of a polyisocyanate in an organic solvent. The polyisocyanates which are useful in the practice of the invention are, in general, any of the organic di- or polyisocyanates. Particularly preferred are the di- or triisocyanates because of their availability and ease of preparation. Representative polyisocyanates include, among others: benzene-1,3- or 1,4-diisocyanate; toluene-2,3-, 2,4- or 2,5-diisocyanate; diphenylmethane - 4,4' - diisocyanate (mixture of 2,4 and 2,6 isomers); diphenyl-2,2'- or 4,4'-diisocyanate; diphenyl-3,3'-dimethyl-4,4' - diisocyanate; 2-chloro-propane-1,3-diisocyanate; diphenyl-3,3'-dimethoxy-4,4'-diisocyanate; naphthalene - 1,5 - diisocyanate; tetramethylene diisocyanate; pentamethylene diisocyanate; hexamethylene diisocyanate; octamethylene diisocyanate; dimethylene diisocyanate; propylene - 1,2 - diisocyanate; naphthalene-1,8- or 2,7-diisocyanate; toluene-2,3,4- or 2,4,6-triisocyanate; benzene-1,2,3-, 1,2,4- or 1,3,5-triisocyanate; triphenylmethane triisocyanate (Mobay's Mondur TM): the polymethylene polyphenyl polyisocyanates having the formula

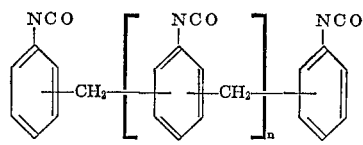

where $n$ is an integer which is typically 1 to 3, e.g. the product known as PAPI-1 (Carwin Company) in which $n$ has an average value of 1, and the like, as well as mixtures of two or more of any of the above polyisocyanates.

The polyisocyanate is used as a solution in an organic solvent which can be any of the known organic liquids or mixtures thereof which are solvents for the polyisocyanates. Typical solvents include the aliphatic and aromatic hydrocarbons, ketones, esters and the like, and preferably the chlorinated or alkylated aromatics such as monochlorobenzene, xylene or toluene, the chlorinated aliphatics such as methylene chloride, dichloromethane, or dichloroethane, the acetates and mixtures thereof. Particularly preferred is a mixture of methylene chloride and methylisobutyl ketone or methyl ethyl ketone.

While the amount of polyisocyanate will vary widely depending upon such factors as the particular polyisocyanate, the insulator material and surface area of the insulator, it is usually desirable to apply a minimum of about 0.002 gram of polyisocyanate solids per square inch of insulator surface area. Under most conditions a maximum of about 0.030 gram per square inch of surface area is in excess and does not provide further improvement, although under some circumstances more or less can be used without detriment to bonding strength. Preferably the amount of polyisocyanate solid per square inch of surface area will range from about 0.007 to about 0.010 gram. The amount of polyisocyanate used can also be expressed in terms of millimoles of polyisocyanate add-on per square inch of insulator surface. Expressed in this manner the amount of polyisocyanate will preferably fall within the range from about 0.1 to about 2.5 millimoles per square inch and most preferably within the range from about 0.5 to 1 millimole per square inch.

The polyisocyanate solution can be applied to the insulated surface in any suitable concentration and in any convenient manner for coating a solid with a liquid such as by flooding, spraying, brushing or the like. After the polyisocyanate solution has been applied, the treated surface is dried for solvent removal. Usually, the treated surface is heated until dry, using temperature between about 75° to about 180° F. After the treated insulator surface is dried the uncured carboxy-containing rubber liner material is applied to the dried surface in conventional manner, as by spraying or brushing and the liner cured, as by heating in a circulating forced air oven at from about 100 to about 200° F. for 1 to 36 hours, or longer. The composite propellant composition is then poured or cast against the cured liner in conventional manner and cured for a predetermined period of time.

In order to illustrate the effectiveness of the method of the invention, silica-filled, styrene-butadiene rubber insulators were first degreased with methylene chloride to remove surface contaminants and then a 10% solution of triphenylmethane triisocyanate in a mixture of methylene chloride and lacquer grade methyl isobutyl ketone (4:5, by weight) was applied by brush to one surface of each of the rubber insulators (0.008 gram of polyisocyanate solid per square inch of insulator surface area). After drying at 150° F. for 1 hour to remove residual solvent, a 0.02 to 0.03 inch coating of a liner composition containing a commercial carboxy - terminated polybutadiene having a molecular weight of about 5000 and a carboxyl content of 0.032 to 0.036 equivalents per 100 grams of polybutadiene, N,N,O-tris(epoxypropyl) p - aminophenol as epoxide curing agent, colloidal silica and a metal salt catalyst-plasticizer dispersion, and having an epoxide to carboxyl equivalency ratio of 1.3 to 1, was applied to each of the dried and treated surfaces by doctor blade and the liners cured for 6 to 8 hours at 150° F. A composite propellant formulation was then cast against each of the liners and the propellant cured at 175° F. for 7 days. The propellant formulation was prepared by mixing ammonium perchlorate solid oxidizer and powdered aluminum metal fuel with a binder solution containing a carboxy-terminated polybutadiene having a molecular weight of about 5000 and a carboxyl content of 0.032 to 0.036 equivalents per 100 grams of polybutadiene, an epoxide curing mixture of the diglycidyl ether of bisphenol A and N,N,O - tris(epoxypropyl) p - aminophenol (mole ratio 5.3:1) and metal salt catalyst-plasticizer dispersion. The epoxide to carbonyl equivalency ratio of the binder was 1.02 to 1 and the solids (oxidizer and metal fuel) to binder solution ratio was 87 to 13. Bond-in tension tests were conducted on the cured propellants according to test method 4.7.1, Interagency Chemical Rocket Propellant Group, "Solid Propellant Behavior Manual," Chemical Propulsion Information Agency Publication No. 21. Bond stress, mode of failure and aging characteristics of the cured propellants are tabulated below.

TABLE 1

|  | Temperature °F. | | | | | | | |
| --- | --- | --- | --- | --- | --- | --- | --- | --- |
|  | −70 | +77 | +170 | +250 | +300 | 77 | 175 | 215 |
| Bond stress (p.s.i.) at 0.2 inch/min. crosshead speed | 380 | 73 | 52 | 39 | 24 | | | |
| Mode of failure [2] | PC | PC | PC | PC | PC | | | |
| Bond stress (p.s.i.) at 0.02 inch/min. crosshead speed | 272 | 60 | 45 | 31 | 17 | | | |
| Mode of failure [2] | PC | PC | PC | PC | PC | | | |
| Tensile strength (p.s.i.) after storage for 96 days [3] | | | | | | 73 | 82 | 93 |

[1] Bond stress and mode of failure data are averages of 3 separate specimens.
[2] PC=Failure occurred in the propellant.
[3] Tensile strength prior to storage was 73 p.s.i.

Preflight Rating Tests performed prior to static firing of full scale rocket motors prepared as above except that the insulated surface which was treated was a silica filled styrene-butadiene rubber premolded in place in the motor casing were satisfactory under the following conditions:

Temperature cycling (minus 65 to 160° F.),
Aeroheat cycling,
Altitude cycling,
Vibration,
Drop (40° F.),
Shock (minus 65° F.), and
Acceleration.

Subsequent static firings on these full scale motors were also made without a single failure.

What I claim and desire to protect by Letters Patent is:

1. A process for chemically bonding the elastomeric insulated surface of a rocket motor casing to the carboxy-containing rubber liner for a composite propellant containing a binder fuel of carboxy-containing rubber prior to casting the propellant, which comprises
    (a) treating said insulated surface with a solution of an organic polyisocyanate in an organic solvent for the polyisocyanate,
    (b) drying the treated surface to remove the solvent,
    (c) applying a liner of uncured carboxy-containing rubber to the dried surface and then
    (d) curing the liner.

2. The process of claim 1 wherein the polyisocyanate is triphenylmethane triisocyanate and the organic solvent is a 1:1 weight mixture of methylene chloride and methylisobutyl ketone.

3. The process of claim 2 wherein the elastomeric insulated surface is a silica filled styrene-butadiene rubber.

4. The process of claim 3 wherein the carboxy-containing rubber is a carboxy-terminated polybutadiene.

5. The process of claim 4 wherein the curing of the liner is carried out in the presence of an epoxide curing agent.

References Cited
UNITED STATES PATENTS

| 3,103,784 | 9/1963 | Vetter et al. | 102—103 X |
| 3,347,047 | 10/1967 | Hartz et al. | 102—103 X |
| 3,381,614 | 5/1968 | Ratz et al. | 102—103 |
| 3,446,018 | 5/1969 | Macbeth | 102—103 |

STEPHEN J. LECHERT, JR., Primary Examiner

U.S. Cl. X.R.

102—103; 264—3 R